Jan. 6, 1948.　　B. E. ANDERSON　　2,433,973
ORIFICE EXCHANGER
Filed Jan. 31, 1945　　2 Sheets-Sheet 1
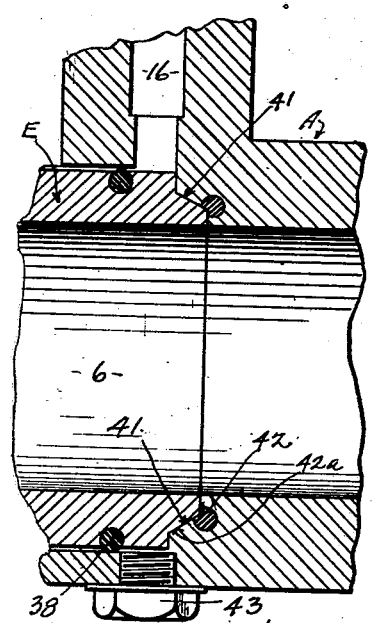
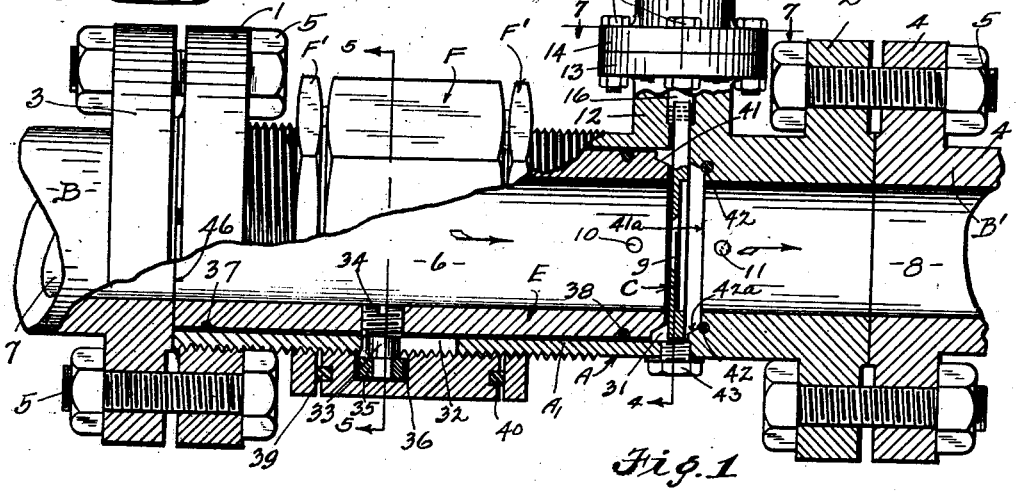
INVENTOR.
BERT E. ANDERSON Jan. 6, 1948.     B. E. ANDERSON     2,433,973
ORIFICE EXCHANGER
Filed Jan. 31, 1945     2 Sheets-Sheet 2
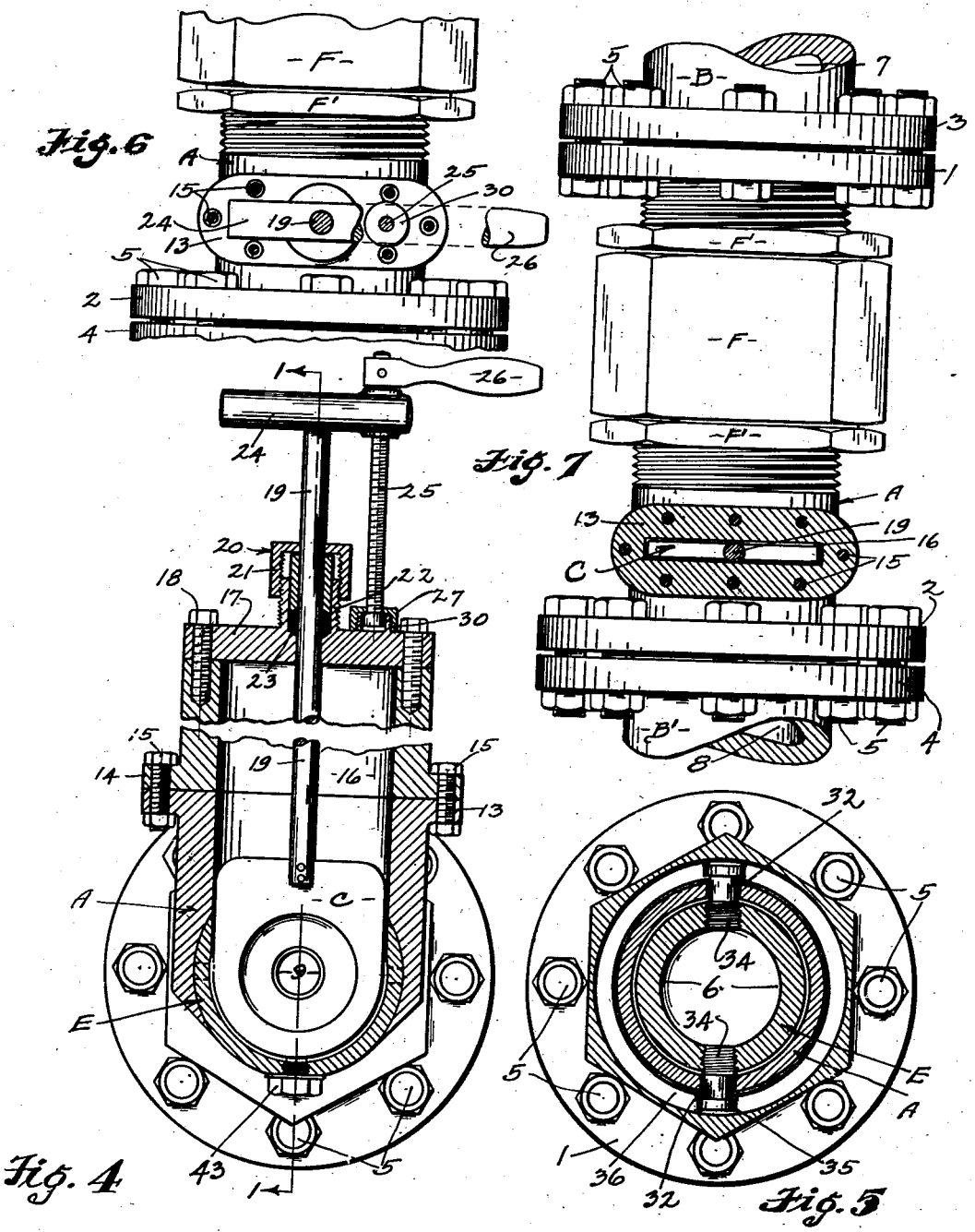
INVENTOR.
BERT E. ANDERSON Patented Jan. 6, 1948

2,433,973

UNITED STATES PATENT OFFICE 2,433,973

ORIFICE EXCHANGER

Bert E. Anderson, Los Angeles, Calif.

Application January 31, 1945, Serial No. 575,468

12 Claims. (Cl. 138—44)

This invention relates to orifice plate exchangers and an object is to provide a structure which will afford the following named characteristics: First, means for readily attaching the orifice plate exchanger in a pipe line for fluids or gases; second, an improved means for retracting an orifice plate from operative position in a line; third, means for manually adjusting the exchanger unit for supporting the orifice plate in operative position for cooperation in metering the volume of fluid in a pipe line, and when retracted into inoperative position for sealing the line against leakage during the continuance of a non-metering stage of operation.

A further object is to provide telescoping and relatively adjustable members disposed coaxially with the pipe line and arranged to be locked in adjusted positions for sealing the orifice plate in operative position and for sealing the flow passage against leakage when the orifice plate is inoperative.

Another object is to provide manually operable means for retracting the orifice plate from and extending the same into operative positions, respectively, at will, by means of a control unit which is effective for preventing the undue movement of the plate when it is moved in either direction. Other objects will appear as the description progresses.

I have shown a preferred form of orifice exchanger embodying my new improvements in the accompanying drawings which, as will be readily apparent to those skilled in the art, is capable of modification, within the scope of the appended claims, without enlarging my invention. In said drawings:

Fig. 1 is an elevation, partly in section on line 1—1 of Fig. 4 showing my new improvements with the orifice plate operatively positioned;

Fig. 2 is an enlarged fragmentary section of the same showing the orifice plate retracted to inoperative position and the exchanger arranged so as to seal the flow passage against leakage into the orifice plate receiving chamber;

Fig. 3 is an enlarged fragmentary view of a portion of the exchanger unit showing the orifice plate retracting stem, control means and packing gland;

Fig. 4 is a sectional elevation on line 4—4 of Fig. 1;

Fig. 5 is a sectional elevation on line 5—5 of Fig. 1;

Fig. 6 is a fragmentary top plan view of Fig. 4, partly in section;

Fig. 7 is a plan view of Fig. 1, the view being partly in section on line 7—7 of Fig. 1.

Briefly described, my improved orifice exchanger includes a cylindrical section A having flanges 1 and 2 at its opposite ends adapted for attachment to flanges 3 and 4, respectively, of pipe line sections B and B', as by means of bolts 5, 5, etc., so that the bore 6 of section A will register and be axially alined with the flow passages 7 and 8 of sections B and B'. An orifice plate C is retractably positioned transversely of bore 6 of the exchanger and is provided with a central orifice 9 which, when the plate is operatively positioned is designed to be coaxial with the bore 6 in order that the flow of fluid through said orifice will have a different pressure on each side of the orifice plate which makes accurate volume measurement by comparison of the upstream and downstream pressures through the instrumentality of a suitable meter (not shown) connected with the upstream and downstream sides of the exchanger at points 10 and 11. It may be noted that a suitable meter is illustrated in my said pending application and is of well known character and not material to my invention.

The exchanger casing A has an upwardly extended neck 12 with a flange 13 thereon which is adapted to be attached to a flange 14 of a head D as by means of bolts 15. Head D and neck 12 are formed with a continuing vertically disposed chamber 16 into which the orifice plate C is adapted at times to be retracted and supported. The top of chamber 16 is closed as by means of a plate 17 attached to head D by screws or bolts 18. By reference to Fig. 4 it will be noted that plate C is operatively positioned in member A and that chamber 16 extends sufficiently above the top of the plate to permit the retraction of the plate upwardly into the chamber to permit closing and sealing of the flow passage 6 as hereinafter described.

Plate C has a stem 19 which extends through top 17 of head D as well as through a suitable packing gland 20 formed of cap 21 threaded onto a nipple 22 of top 17 and adapted to compress packing rings 23 between said gland and the top 17. Stem 19 may have a hand grip 24 by means of which the orifice plate C may be retracted and extended, but preferably is connected with a control means for moving the plate C of the character shown in Figs. 3 and 4. Said control means may include, for instance, a screw 25 which is threaded through grip 24 and is provided with a handle 26, and at its lower end the screw may have an enlarged head 27 which is rotatable in a chamber 28 in a nipple 29 extended upwardly from top plate 17. Screw 25 is operatively connected with top plate 17 as by means of a cap 30 threaded onto nipple 29 and extending through an opening in said cap which is of less diameter than head 27. Thus, by turning handle 26 stem 19 and its attached plate C will be either raised or lowered in accordance with the direction the screw 25 is rotated.

Exchanger A has a counterbore 31 in which a sleeve E is longitudinally adjustable for either confining and sealing the orifice plate C in operative position or, optionally, for sealing the flow passage 6 when the orifice plate is retracted. Said sleeve is arranged and operated as follows: It is slidable longitudinally in the cylindrical portion $A_1$ of member A under the influence of a nut F which is threaded externally on portion $A_1$ as shown in Fig. 1. Member $A_1$ has one or more elongated longitudinal slots 32 adapted to be engaged by pins 33 which are threaded at 34 for detachable engagement with sleeve E and the outer ends of said pins 33 have rollers 35 held suitably thereon which are adapted to rotate in an annular groove 36 formed internally of nut F.

The nut F may be locked in adjusted position as by means of a pair of lock nuts F", F" which are also threaded onto portion $A_1$ of member A. The portion $A_1$ is externally threaded to receive not only the nuts F and F" but also the flange 1, but following the applications of said nuts to the member A the flange 1 is welded to said member. It will be observed that I have provided rings 37 and 38 around and at opposite ends of sleeve E for preventing leakage of pressure or fluid between the sleeve and the member A, as well as other packing rings 39 and 40 between the nut F and the locking nuts F", F".

The downstream end of the sleeve E has a bevelled portion 41 which, as shown in Fig. 2, when the orifice plate C is retracted, is adapted to seat in a correspondingly formed counterbore 42 on the downstream side of bore 6, at which position I provide a compressible annular packing ring 42 arranged to be engaged by the end portion 41 to an extent that will positively seal the junction between bore 6 and chamber 16. Thus the rings 37 and 38 on the upstream side of the orifice place C prevent leakage of fluid and pressure to the left as shown in Fig. 1 between the members A and E, and the ring 42 prevents leakage of pressure between the upstream and downstream portions of bore 6 when the orifice plate is retracted and sleeve E has been moved to the right as far as possible. Also, rings 39 and 40 prevent leakage between the nuts F and F", F" under said last mentioned conditions.

Immediately below the orifice plate C I provide a plug 43 which is threaded into member A and serves a double purpose of limiting the downward thrust of the plate C and when removed of draining off the contents or sediment which may accumulate in the bore 6 adjacent plate C.

It is worthy of note that orifice 9 in plate C is bevelled with its minor portion facing upstream and its major portion facing downstream. Said orifice is so formed for the purpose of providing a sharp edge facing upstream so as to as far as possible prevent an accumulation of grit and sediment from collecting on the orifice plate and thereby reducing the effective area of the orifice therein.

By reason of the arrangement of the orifice plate in member A it will be obvious that when the sleeve E is adjusted to a position of frictional engagement with the upstream side of the orifice plate C and the plate C is then retracted into chamber 16 the plate will be scraped free of accumulated matter on its opposite side, after which single or several such operations the plate may again be seated in its operative position. Such plate cleaning operations may be performed as often as may be necessary. However, when and if it becomes necessary to completely remove a plate C from the exchanger for any purpose, such as for replacement or lack of necessity for its use, the plate may be held in retracted position in its chamber 16 in the head D for as long a time as may be desired, but sleeve E will have, of course, been moved into position for sealing the chamber 16 from bore 6. Or, removal of top plate 17, the plate C may be removed and plate 17 replaced. Head D may also be removed with or without plate C if desired but in such case it is preferable that a temporary plate be applied to flange 13 in lieu of head D.

In operation, the nuts F and F" and flange 1 are applied to the cylinder $A_1$ of member A, said flange is welded or otherwise fixed to the cylinder and sleeve E is inserted in the cylinder and affixed thereto as by applying the pin 33 by screwing it into the sleeve and extending it through slot 32 of the cylinder, roller 35 having been first inserted in the slot 36. Sleeve E is adjusted inwardly to an approximate position with its end 41 adjacent the upstream side of orifice plate C, and after plate C has been extended to operative position and its downward thrust limited by adjustment of screw 43, sleeve E is finally adjusted into wiping contact with the side of the plate C. Thereupon the lock nuts F" are adjusted on the cylinder $A_1$ into leak proof engagement with opposite sides of nut F and the device is in readiness for operation. The exchanger may then be attached to sections B and B' of a pipe line. At necessary intervals the sleeve E may be slightly retracted by loosening nuts F and F" so that upon operation of handle 26 the orifice plate may be retracted for cleaning or other purposes. If, however, plate C is removed the sleeve E is adjusted so that its end 41 will engage a correspondingly formed portion 42a in body A and sealing ring 42 and seal the bore 6 from chamber 16. Of course it is understood that metering of the pressures in the pipe line is effected only when the plate is in operative position as shown in Fig. 1. Cleaning of the orifice plate is effected by alternately retracting and extending the plate C while it is in frictional engagement with the opposite portions of member A.

As usual in such devices a relief valve 45 is applied to head D which is effective at times for relieving and equalizing the pressure in chamber 16 of the head so as not to prevent or impair the retraction of the orifice plate as it is moved to inoperative position. This also avoids blowing out gaskets. When sleeve E is in operative position it is tightly held against flange 3 at 46, making a smooth flow of gas or liquids and eliminating turbulences. This smooth flow increases the accuracy of pressure gauge readings at 10 and 11 when orifice plate C is in operative position.

It will be noted that, as shown in Fig. 1, the orifice 9 is so formed in the plate C as to provide sharp edges on the upstream side of the plate whereby when the sleeve E is moved to the right in frictional contact with the plate the end of the sleeve will clean off all accumulated sediment as the plate is retracted from and extended into operative position. It is absolutely necessary, in order to assure satisfactory operation, that the effective diameter of the orifice 9 shall be maintained and that any accumulations around the margin of the orifice which would tend to reduce the effective diameter thereof be prevented.

Attention is directed to the fact that sleeve E operates as a cylindrical valve which when open and closely engaging plate C serves to cooperate in supporting the valve in operative position, and when closed, as shown in Fig. 2, serves to seal off chamber 16 from the flow passage 6, and at the same time to provide a tightly closed joint between body A and the sleeve so that the flow of a fluid through the passage will not be impaired or obstructed at the joint. The same is true of the joint between flanges 1 and 3 and between flanges 2 and 4, it being understood that the passages 7 and 8 of the pipe sections B and B' and the passages in the sleeve and body are of identical area. It may be understood that the orifice plate C may be readily detached from the operating handle and a new plate attached thereto.

The ports 10 and 11 which are arranged for connection with a flow meter are preferably arranged in pairs, one on each side of the body and diametrically opposite each other, so that a meter may be connected to either side of the body and the ports on the other side plugged by suitable means.

I claim:

1. An orifice plate exchanger comprising: a casing arranged for attachment at its opposite ends with adjacent sections of a pipe line and a longitudinal flow passage extending therethrough, a transversely disposed seat being formed between the two sections of the flow passage, a retractable orifice plate adapted to engage and disengage said seat when the plate is manually operated for movement between operative and inoperative positions, a sleeve longitudinally adjustable in the upstream portion of the flow passage and having a passage therein corresponding in area to that of the downstream passage in the casing, and means externally mounted on the casing and operatively connected with and for adjusting the sleeve relative to the orifice plate, said latter means being concentric with the sleeve.

2. An orifice plate exchanger comprising: a casing having a longitudinal passage extending therethrough and arranged for attachment at its opposite extremities with adjacent sections of a pipe line, the upstream portion of said passage being of greater area than the downstream portion thereof, an orifice plate retractably mounted in the casing in a plane transversely of the flow passage and intermediate the extremities of the casing, a sleeve adjustable in the upstream portion of the flow passage of the casing and having a passage of an area corresponding to that of the downstream portion of the casing passage, the downstream portion of the casing being formed with a seat for receiving the downstream end of said sleeve, said orifice plate being adapted to be seated operatively in the casing between the downstream end of said sleeve and the adjacent seat in the casing, means concentric with and externally on the casing but internally connected with and for adjusting the sleeve longitudinally in the flow passage relative to the orifice plate, and means for retracting the orifice plate while the sleeve is held in a predetermined position relative to the plate.

3. An orifice plate exchanger comprising: a casing having a longitudinal passage extending therethrough and arranged for attachment at its opposite extremities with adjacent sections of a pipe line, the upstream portion of said passage being of greater area than the downstream portion thereof, an orifice plate retractably mounted in the casing in a plane transversely of the flow passage and intermediate the extremities of the casing, a sleeve adjustable in the upstream portion of the flow passage of the casing and having a passage of an area corresponding to that of the downstream portion of the casing passage, the downstream portion of the casing being formed with a seat for receiving the downstream end of said sleeve, said orifice plate being adapted to be seated operatively in the casing between the downstream end of said sleeve and the adjacent seat in the casing, means concentric with and externally on the casing but internally connected with and for adjusting the sleeve longitudinally in the flow passage relative to the orifice plate, and means for retracting the orifice plate as for cleaning and removal while the sleeve is held in a predetermined position relative to the plate, a head detachably secured to said casing and formed with a chamber for receiving the orifice plate when the plate is retracted to inoperative position, means for sealing the flow passage of the casing and sleeve against leakage of fluid while and when the orifice plate is adjusted to desired position, and resilient packing means to seal the joint between the sleeve and the seat on the downstream portion of the casing to prevent leakage into the chamber of said head when the plate is retracted to inoperative position.

4. An orifice plate exchanger comprising: a fixture having a smooth, unobstructed cylindrical body arranged for connection with sections of a pipe line at its opposite extremities, an orifice plate removably mounted in said body and disposed transversely across the fluid passage of the body, and a cylindrical member adjustable longitudinally in the body relative to the orifice plate and adapted to confine the orifice plate in operative position and when the orifice plate is removed to seal the fluid passage against leakage of fluid, means mounted externally on said body and connected with said adjustable member for adjusting and locking the adjustable member in selected position, said latter means being concentric with the body.

5. An orifice plate exchanger comprising: a fixture having a smooth, unobstructed cylindrical body arranged for connection with sections of a pipe line at its opposite extremities, an orifice plate removably mounted in said body and disposed transversely across the fluid passage of the body, a tubular cylindrical member adjustable longitudinally in the body relative to the orifice plate and adapted to confine the orifice plate in operative position and when the orifice plate is removed to seal the fluid passage against leakage of fluid, means holding said cylindrical member against rotation in said body, said adjustable member being mounted on the upstream side of the orifice plate and having a bore therein of an area corresponding to that of the flow passage in said body, annular means mounted around said cylindrical body for axial displacement thereon, and operative connection between said annular means and the tubular cylindrical member, a head detachably secured to said body and formed with a chamber for receiving the orifice plate when the same is retracted to inoperative position, and manually operable means on said head for extending and retracting the orifice plate to and from operative position, respectively. Said manually operable means including a stem attached to the orifice plate and extended through and from said head, and a screw operatively connected with the stem outside the head whereby when the screw is rotated the orifice plate and stem will be gradually retracted or extended under the control of an operator.

6. In an orifice plate exchanger, a tubular body, a tubular sleeve within the body and having an end constituting a valve, an external tubular member adjustably engaged with the body, and means inter-connecting the tubular sleeve and the external member for effecting adjustment of said sleeve and its valve upon adjustment of the external member.

7. An orifice plate exchanger as characterized in claim 6 including: a member engageable with each end of the external tubular member and adjustably mounted on the body for locking said external tubular member in adjusted position.

8. In an orifice plate exchanger, a tubular body, a tubular sleeve within the body and having an end constituting a valve, an external tubular member adjustably engaged with the body, and means inter-connecting the tubular sleeve and the external member for effecting adjustment of said sleeve and valve upon adjustment of the external member; said body having an opening through which the latter means extends.

9. In an orifice plate exchanger, a tubular body, a tubular sleeve within the body and having an end constituting a valve, an external tubular member adjustably engaged with the body, and means inter-connecting the tubular sleeve and the external member for effecting adjustment of said sleeve and valve upon adjustment of the external member, said latter means comprising at least one radially arranged pin operably movable in a longitudinal slot formed in the tubular body.

10. In an orifice plate exchanger having: a cylindrical casing section situated on the upstream portion of the casing; a generally tubular operating member threadedly engaging the exterior of the cylindrical casing section; means extended through the casing and operatively connecting said operating member with the sleeve whereby the sleeve may be axially slid in the casing for confining the orifice plate in operative position and for sealing the casing against leakage when the orifice plate is inoperatively positioned; and means for locking said tubular operating member in adjusted position.

11. An orifice plate exchanger as set forth in claim 10 and in which the downstream end of the sleeve is provided with a projecting frustro-conical peripheral projection and the casing adjacent the downstream side of the orifice plate is provided with a re-entrant frustro-conical peripheral recess adapted to receive the cooperatively formed end of the sleeve when the orifice plate is retracted from operative position, the mating of the sleeve and casing providing a continuous passage.

12. An orifice plate exchanger as set forth in claim 10 and in which the downstream end of the sleeve is provided with a projecting frustro-conical peripheral projection and the casing adjacent the downstream side of the orifice plate is provided with a re-entrant frustro-conical peripheral recess adapted to receive the cooperatively formed end of the sleeve when the orifice plate is retracted from operative position, the mating of the sleeve and casing providing a continuous passage; and a compressible sealing ring carried by the body for engagement with the projecting frustro-conical end of the valve when the valve is closed.

BERT E. ANDERSON.

REFERENCES CITED

The following references are of record in the file of this patent:

UNITED STATES PATENTS

| Number | Name | Date |
|---|---|---|
| 174,035 | Vick | Feb. 22, 1876 |
| 1,822,961 | Emery | Sept. 15, 1931 |
| 1,938,460 | Muff | Dec. 5, 1933 |